United States Patent Office 3,419,800
Patented Dec. 31, 1968

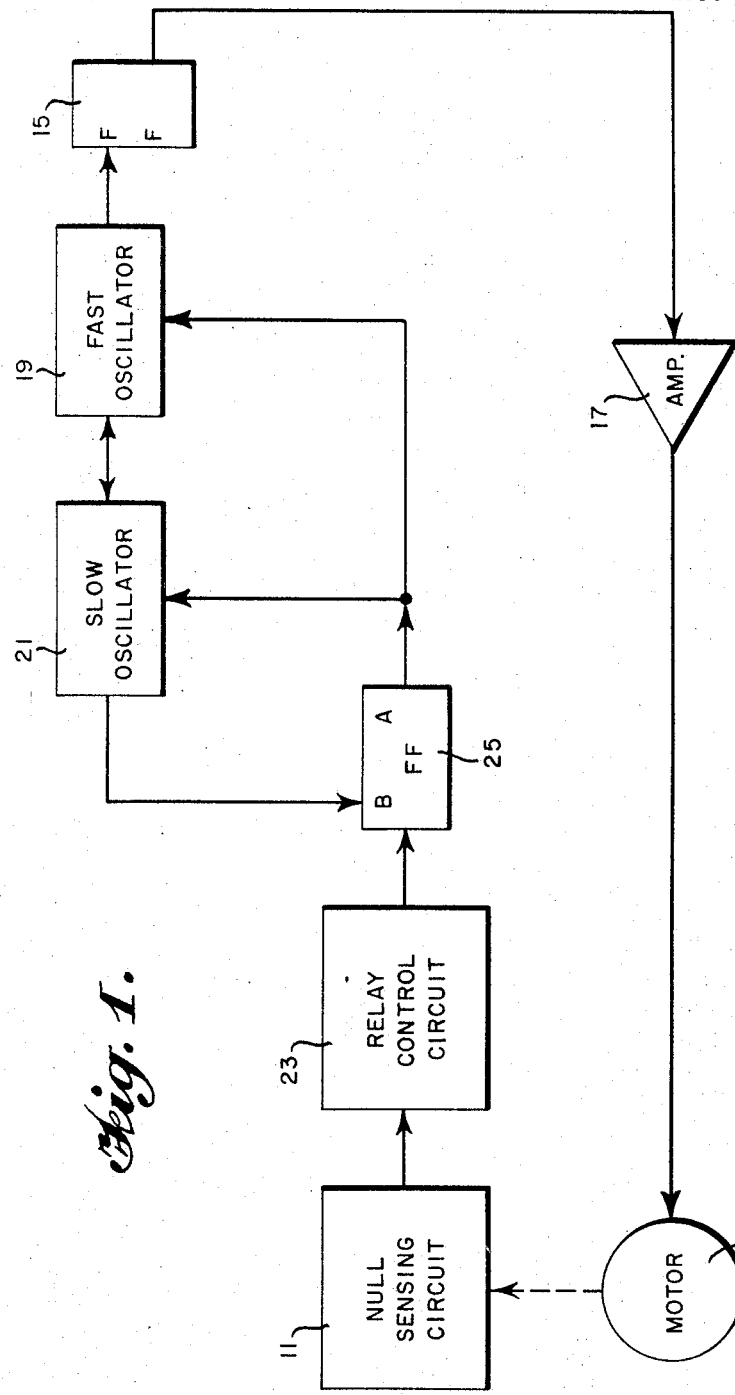

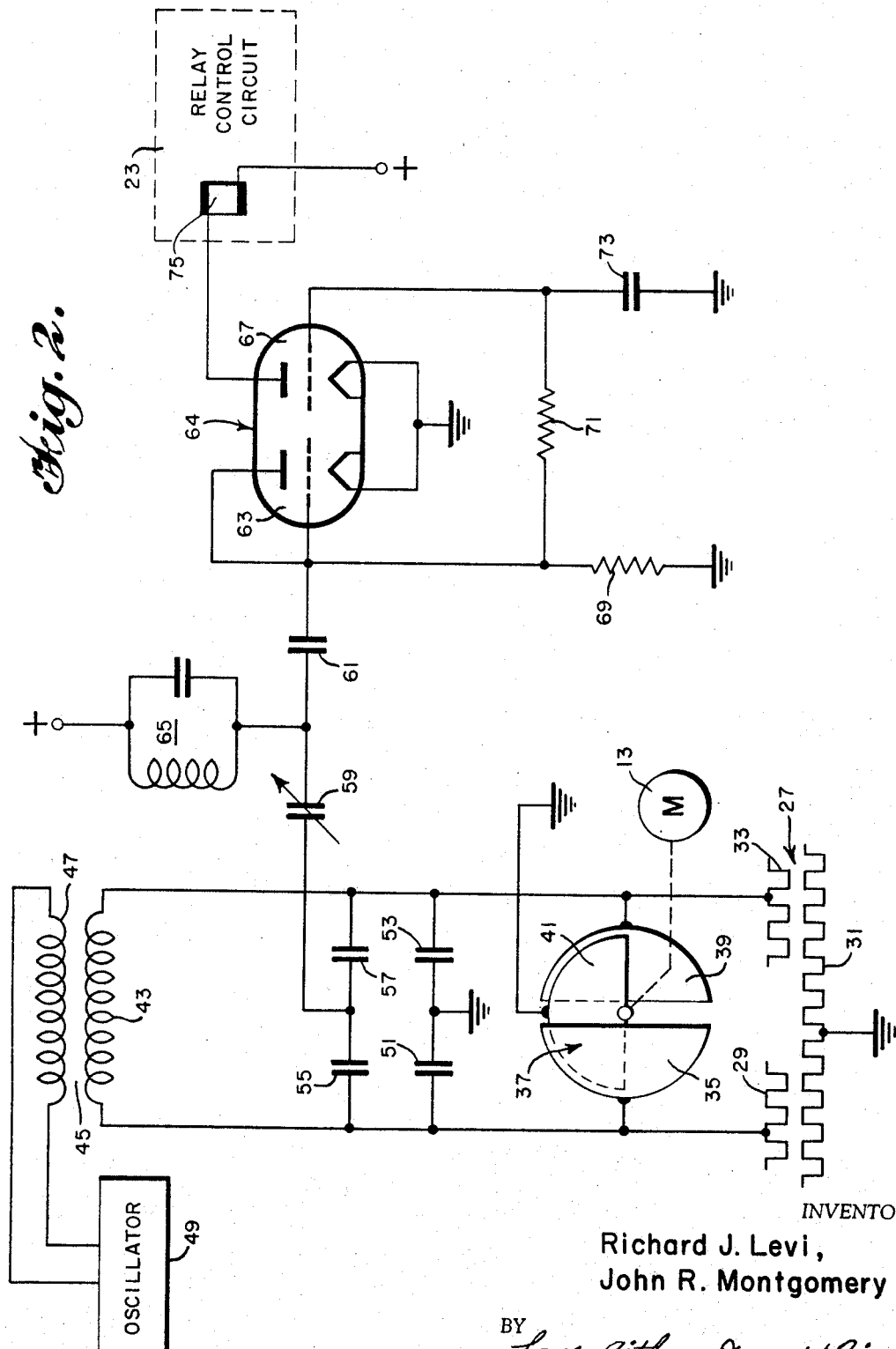

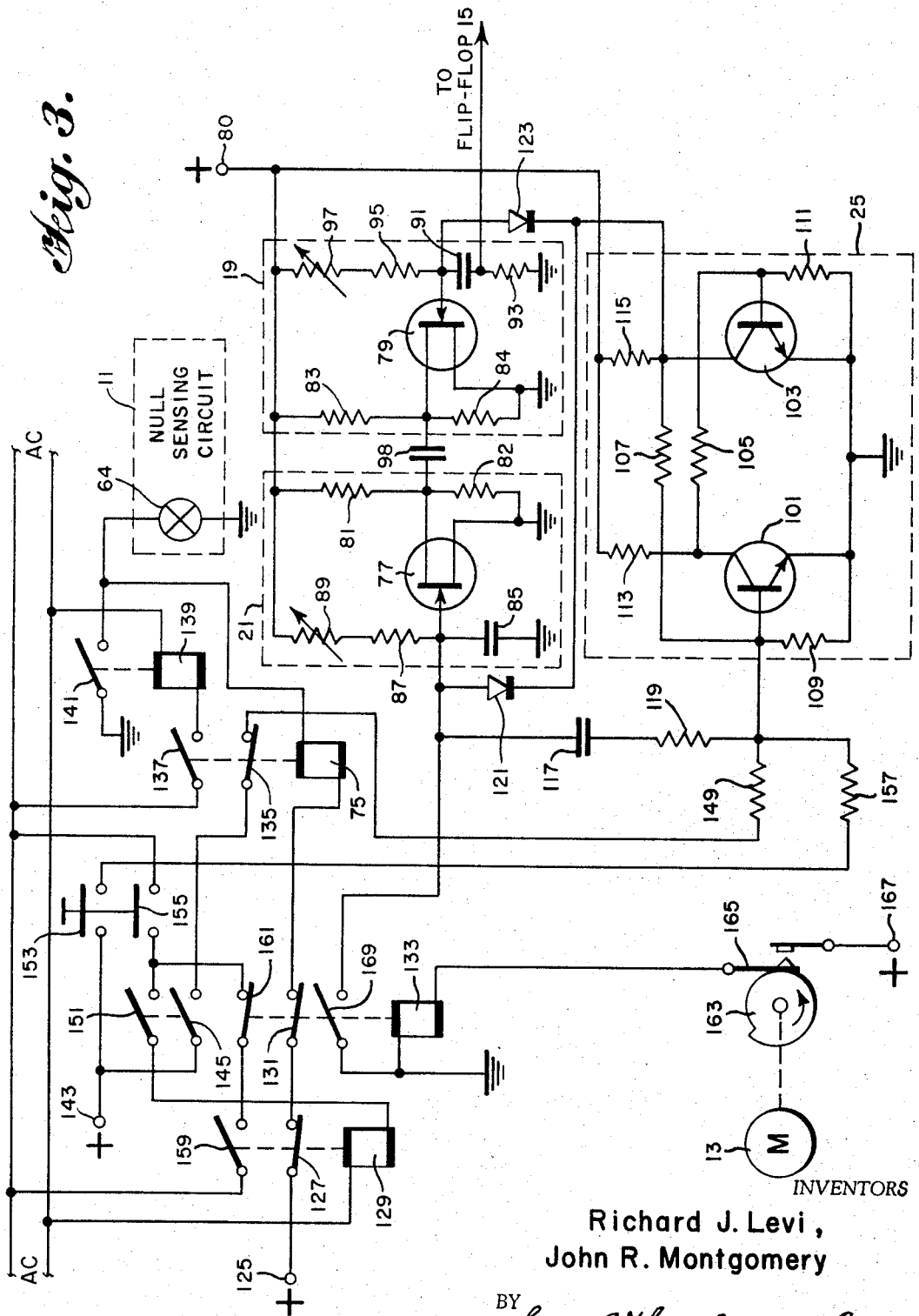

3,419,800
GAUGING SYSTEM INCLUDING AUTOMATIC BALANCING AND STOPPAGE MEANS
Richard J. Levi, Closter, N.J., and John R. Montgomery, Trumbull, Conn., assignors to Electro-Autosizing Machine Corporation, Closter, N.J., a corporation of New Jersey
Filed Dec. 17, 1964, Ser. No. 419,001
9 Claims. (Cl. 324—61)

ABSTRACT OF THE DISCLOSURE

This specification discloses a classification system for classifying precision mechanical parts. The size of the mechanical part is represented as the value of a capacitance by means of a capacitance gauge. This capacitance is compared with a reference capacitance in a bridge circuit. The reference capacitance is incrementally stepped by stepping motor in response to pulses produced by a first oscillator which is synchronized with a second oscillator producing pulses at a slower rate. The pulse rate of the first oscillator is a multiple of the pulse rate of the second. The pulses of the second oscillator mark the boundaries of the classification zones into which the parts are to be classified. Means are provided to stop the oscillation of both the oscillators when the second oscillator produces a pulse after null has been detected by the bridge circuit. Accordingly, after null has been detected in the bridge circuit, the stepping motor will continue to increment the reference capacitance until the slower oscillator produces a pulse at which time it will stop. The position of the stepping motor can then be used to indicate the classification zone in which the size of the part being classified falls.

---

This invention relates to an automatic classification system and more particularly to a system for classifying precision mechanical parts according to their size.

It is often desirable to classify precision mechanical parts, such as bearing balls for example, according to their size. In such an operation the classification zone into which each part size falls is the desired information rather than the actual size of the part being classified. Of course, if the actual size of the part is known, the classification zone into which it falls can be determined. However this procedure involves decision making on the part of the classifier and therefore is subject to human error and ambiguities. The present invention provides a system which automatically will indicate the classification zone of the part being classified and thus avoids these problems.

Accordingly, it is an object of the present invention to provide an improved classification system.

A further object of the present invention is to provide an improved classification system for classifying precision mechanical parts according to their size.

A still further object of the present invention is to eliminate the problem of human error and ambiguities in classifying precision mechanical parts.

A still further object of the present invention is to provide a classification system in which human error and ambiguities have been eliminated.

In accordance with the present invention the size of the part to be classified is represented as a capacitance, which is compared with a reference capacitance in a bridge circuit. The reference capacitance is incrementally stepped by a stepping motor in response to pulses produced by a first oscillator, which is synchronized with a second oscillator producing pulses at a slower rate. The pulse rate of the first oscillator is a multiple of the pulse rate of the second. The pulses of the slower second oscillator mark the boundaries of the classification zones. Means are provided to stop the oscillation of both of the oscillators when the second oscillator produces a pulse after a null has been detected in the bridge circuit. As a result, after a null has been detected in the bridge circuit, the stepping motor will continue to step until the slower second oscillator produces a pulse at which time it will stop. The position of the stepping motor can then be used to indicate the classification zone into which the size of the part being classified falls.

Further objects and advantages of the present invention will become readily apparent as the following detailed description of the invention unfolds and when taken into conjunction with the drawings wherein:

FIG. 1 is a block diagram illustrating the invention;
FIG. 2 is a circuit diagram of the null sensing circuit in the block diagram of FIG. 1; and
FIG. 3 is a circuit diagram of the relay control circuit, the slow oscillator, the fast oscillator, and one of the flip-flops of the block diagram shown in FIG. 1.

The size of the part to be classified is represented by a capacitance in a null sensing circuit designated by the reference number 11 in FIGURE 1. This capacitance is compared with a reference capacitance in a bridge circuit in the null sensing circuit. The value of the reference capacitance is incrementally stepped by means of a stepping motor 13, which is driven by pulses from a flip-flop 15 after they are amplified by an amplifier 17. The flip-flop 15 receives pulses produced by an oscillator 19 and the flip-flop 15 switches states in response to each pulse from the oscillator 19. The flip-flop 15 thus operates as a frequency divider dividing the output pulse frequency of the oscillator 19 by 2. The stepping motor 13 is of the type which advances one step at the beginning and the end of each applied pulse. Thus the motor 13 takes two steps for each pulse produced by the flip-flop 15 or one step for each pulse produced by the oscillator 19. The oscillator 19 is synchronized with an oscillator 21 so that it produces pulses at a rate four times as great as the oscillator 21. Accordingly the oscillator 19 is referred to as the fast oscillator and the oscillator 21 is referred to as the slow oscillator.

When the null sensing circuit 11 detects a null, it causes a relay to be energized in a relay control circuit 23. When this relay is energized, it removes a bias voltage from a flip-flop 25, which is also connected to receive the pulses produced by the slow oscillator 21. The two stable states of the flip-flop 25 are designated as the A state and the B state. At the start of the classifying operation the flip-flop 25 will have been set in its A state and as long as the bias voltage is applied to the flip-flop 25 from the relay control circuit 23 the flip-flop 25 will not be switched from its A state. After the bias voltage has been removed from the flip-flop 25 as a result of the null sensing circuit 11 detecting a null, the next pulse produced by the slow oscillator 21 will cause the flip-flop 25 to switch to its B state. The pulses applied to the flip-flop 25 by the slow oscillator 21 will not switch the flip-flop 25 to its B state prior to the time that the null sensing circuit 11 senses a null because of the bias voltage applied to the flip-flop 25 from the relay control circuit 23. When the flip-flop 25 has been switched to its B state, it disables both the oscillators, 19 and 21 and stops them from oscillating. Thus the motor 13 will stop stepping the reference capacitor in the null sensing circuit 11. Accordingly the motor 13 will step the reference capacitor in the null sensing circuit 11 until the null sensing circuit detects a null whereupon the motor 13 will continue to step the reference capacitor until the slow oscillator 21 produces an output pulse at which time the stepping will cease. Thus the pulses produced by the slow oscillator 21 mark the boundaries between classification zones and the position to which the reference capacitor has been stepped indicates the classification zone of the size of the part being classified.

In the system of the present invention the size of the part being classified is actually represented by two complementary capacitance values which vary in opposite directions. Similarly, the reference capacitor is actually a double capacitor providing two capacitance values which vary in opposite directions when the double capacitor is being stepped by the stepping motor 13. In FIG. 2, which is a diagram of the null sensing circuit 11, the reference number 27 designates a capacitance gauge, which represents the sizes of the parts to be classified as capacitance values. This capacitance gauge is fully disclosed in the patent to Pierre Buisson No. 2,611,964 issued Sept. 30, 1952. In the capacitance gauge 27 one capacitance value is provided between a plate 29 and a plate 31 and the other between a plate 33 and the plate 31. As disclosed in the above-mentioned Buisson patent, the position of the plates 29 and 33 relative to the plate 31 varies with the sizes of the parts being gauged by the capacitance gauge or in other words with the sizes of the parts being classified by the system of the present invention. The plates 29 and 33 are fixed relative to one another and are positioned relative to one another so that the values of the capacitances between the plates 29 and 31 and between the plates 33 and 31 change in opposite directions with variations in the sizes of the parts being gauged.

In FIGURE 2 the variable double capacitor, which is the reference capacitor, is designated by the reference number 37. The plate 29 of the capacitance gauge 27 is connected to a fixed plate 35 of the variable double capacitor 37 and the plate 33 of the capacitance gauge 27 is connected to a fixed plate 39 of the double capacitor 37. The plate 31 of the capacitance gauge 27 is connected to ground. The variable double capacitor 37 has a rotatable plate 41 and provides one variable capacitance between the plate 35 and the plate 41 and the other between the plate 39 and the plate 41. The rotatable plate 41 of the double capacitor 37 is connected to ground. The stepping motor 13 drives the rotatable plate 41 to incrementally vary the two capacitance values provided by the double capacitor 37 in opposite directions.

The secondary winding 43 of a transformer 45 is connected between the plates 35 and 39 of the double capacitor 37. An oscillator 49 is connected across the primary winding 47 of the transformer 45 so that an AC signal voltage of constant amplitude is applied between the plates 35 and 39 of the double capacitor 37 and between the plates 29 and 33 of the capacitance gauge 27. A capacitor 51 is connected from the plates 29 and 35 to ground and a capacitor 53 is connected from the plates 39 and 33 to ground. A pair of equal capacitors 55 and 57 are connected in series across the secondary winding 43 of the transformer 45. The capacitors 51, 53, 55 and 57 as well as the capacitances provided by the capacitance gauge 27 and the double capacitor 37 are thus connected in a bridge circuit in which the capacitance between the plates 29 and 31 of the capacitance gauge 27, the capacitance between the plates 35 and 41 of the variable double capacitor 37, and the capacitor 51 are connected in parallel to form one leg and the capacitance between the plates 33 and 31 in the capacitance gauge 27, the capacitance between the plates 39 and 41 in the variable double capacitor 37, and the capacitor 53 are connected in parallel to form another leg. The capacitors 55 and 57 form the other two legs of the bridge circuit and the output from the bridge circuit is taken from the junction between the two capacitors 55 and 57.

To achieve a null at the junction between the capacitors 55 and 57 the capacitances of the other two legs of the bridge circuit consisting of the parallel capacitances must be equal. Thus the capacitances provided by the dual capacitor 37 must complement those provided by the capacitance gauge 27. When the movable plate of the dual capacitor 37 is positioned so as to properly compensate the capacitances provided by the capacitance gauge 27, no signal voltage will be produced at the junction between the plates 55 and 57 and thus a null will be achieved.

The junction between the plates 55 and 57 is connected through a series circuit of a variable capacitor 59 and a capacitor 61 to the grid of one side 63 of a double triode 64. The junction between the capacitors 59 and 61 is connected to a source of positive potential through a filter circuit 65. The other side of the double triode 64 is designated by the reference number 67. The grid of the side 63 is connected to the plate of this side and the cathode of the side 63 and the cathode of the other side 67 are connected to ground. The grid of the side 63 is connected to ground through a resistor 69 and is connected to the grid of the other side 67 through a resistor 71. The grid of the other side 67 is connected to ground through a capacitor 73, and the plate of the other side 67 is connected to a source of positive potential through the coil of a relay 75 in the relay control circuit 23.

When the bridge circuit is not at a null, the AC signal produced at the junction between the capacitors 55 and 57 upon being applied to the grid and the plate of the side 63 of the double triode 64 will cause this side of the double triode to conduct on the positive half cycles of the voltage. This will draw current from the capacitor 73 and cause the capacitor 73 to become charged to a negative value, thus biasing the grid of the side 67 of the double triode 64 to a negative value and cutting off the side 67. When a null occurs in the bridge circuit and the signal voltage produced at the junction between capacitors 55 and 57 drops to zero, the side 63 of the double triode will stop conducting and as a result the capacitor 73 will discharge. When the capacitor 73 discharges, the side 67 of the double triode will start conducting and will energize the relay 75. In this manner the double triode 64 acts as an electronic switch which closes to energize the relay 75 in response to a null occurring in the capacitance bridge circuit.

As shown in FIG. 3 the slow oscillator 21 comprises a unijunction transistor 77 and the fast oscillator comprises a unijunction transistor 79. One of the bases of the unijunction transistor 77 is connected to a source of positive potential at a terminal 80 through a resistor 81 and to ground through a resistor 82. The other base of the unijunction transistor 77 is connected directly to ground. Similarly, one of the bases of the unijunction transistor 79 is connected to the source of positive potential at terminal 80 through a resistor 83 and to ground through a resistor 84. The other base of the unijunction transistor 79 is connected directly to ground. The emitter of the unijunction transistor 77 is connected to ground through a capacitor 85 and to the source of positive potential at terminal 80 through the series circuit of a resistor 87 and a variable resistor 89. The emitter of the unijunction transistor 79 is connected to ground through the series circuit of a capacitor 91 and a resistor 93 and is connected to the source of positive potential applied at terminal 80 through the series circuit of a resistor 95 and a variable resistor 97. A capacitor 98 connects the ungrounded bases of the unijunction transistors 77 and 79 together.

In operation the capacitor 85 charges up through the resistors 87 and 89 until the unijunction transistor 77 fires at which time the capacitor 85 discharges through the unijunction transistor 77, whereupon conduction through the transistor 77 stops and the capacitor 85 again starts to charge. In this manner the transistor 77 functions as a relaxation oscillator. The unijunction transistor 79 oscillates in a similar manner with the capacitor 91 charging up through the resistors 95 and 97 and discharging through the transistor 79 when the transistor 79 fires.

The resistors 95, 97 and 93 are selected relative to the capacitor 91 and the resistors 87 and 89 are selected relative to the capacitor 85 so that the transistor 79 oscillates about four times as fast as the transistor 77. Output pulses from the fast oscillator 19 comprising the unijunction transistor 79 are taken from the junction between the capacitor 91 and the resistor 93 and are applied to the flip-flop 15. The oscillations of the two transistors 77 and 79 are synchronized by the fact that when the transistor 77 fires it applies a step voltage through the capacitor 98 to the unijunction transistor 79 and causes the transistor 79 to fire. The timing of the cycling of the two transistors are adjusted so that the transistor 77 will fire slightly before the transistor 79 fires for the fourth time after the preceding firing of the transistor 77. However if the transistor 79 should fire for the fourth time before the transistor 77 fires, it will apply a step voltage through the capacitor 98 to the transistor 77 and cause the transistor 77 to fire. The first, second and third firings of the transistor 79 will not cause the transistor 77 to fire because the voltage applied to the emitter of the transistor 77 across the capacitor 85 will not be approaching the value at which the transistor 77 fires. In this manner the transistors 77 and 79 are synchronized with each other with the transistors 79 oscillating at a frequency four times that of the transistor 77.

The flipflop 25 comprises a pair of NPN transistors 101 and 103, the emitters of which are connected to ground. The collector of the transistor 101 is connected to the base of the transistor 103 through a resistor 105 and the collector of the transistor 103 is connected to the base of the transistor 101 through a resistor 107. The bases of the transistors 101 and 103 are connected to ground through resistors 109 and 111 respectively. The collectors of the transistors 101 and 103 are connected to the source of positive potential applied at the terminal 80 through resistors 113 and 115 respectively. The emitter of the unijunction transistor 77 is connected to the base of the transistor 101 through a series circuit of a capacitor 117 and a resistor 119. The emitter of the unijunction transistor 77 is also connected to the collector of the transistor 103 through a diode 121, which is poled to allow current flow from the transistor 77 to the transistor 103. Similarly, the emitter of the unijunction transistor 79 is connected to the collector of the transistor 103 through a diode 123, which is poled to allow current flow from the transistor 79 to the transistor 103. The diodes 121 and 123 serve to stop the oscillation of the transistors 77 and 79 when the flipflop comprising the transistors 101 and 103 is in its B state. When the flipflop 25 is in its B state the transistor 103 will be conducting. As a result current will flow from the emitters of the unijunction transistors 77 and 79 through the diodes 121 and 123 through the transistor 103 to ground and as a result the voltage at the emitters of the unijunction transistors 77 and 79 will be held near ground. Accordingly, the transistors are prevented from oscillating.

As shown in FIG. 3 when the electronic switch comprising the double triode 64 conducts in response to a null occurring in the bridge circuit of the null sensing circuit 11, it will complete a circuit from a positive potential applied at a terminal 125 through the relay 75 to ground, thus energizing the relay 75. This circuit is completed through the normally closed contacts 127 of a relay 129 and through the normally closed contacts 131 of a relay 133. When the relay 75 is energized it opens its normally closed contacts 135 and closes its normally open contacts 137. When the normally open contacts 137 close, a circuit is completed across an AC source through a relay 139, which then closes its normally open contacts 141. When the normally open contacts 141 close, they provide a circuit to ground bypassing the electronic switch 64 in the null sensing circuit 11 so that a holding circuit is provided to maintain the relay 75 energized.

The normally closed contacts 135 of the relay 75 connect a source of positive potential applied at a terminal 143 through a switch 145 and a resistor 149 to the base of the transistor 101. The switch 145 is ganged with a switch 151 and these two switches together comprise an off-on control and are closed when a classification operation is being carried out. Thus, the positive potential applied at terminal 143 will be connected to the base of the transistor 101 through the resistor 149 when the relay 75 is not energized. During a classification operation the flipflop 25 comprising the transistors 101 and 103 will start out in its A state so that the transistor 101 is conducting and the transistor 103 is non-conducting. Accordingly the fast and slow oscillators 19 and 21 will not be prevented from oscillating by the flipflop 25. Each time the transistor 77 comprising the slow oscillator 21 fires, it will apply a negative going pulse to the base of the transistor 101 through the capacitor 117 and the resistor 119. Each pulse applied to the base of the transistor 101 from the transistor 77 will tend to switch the flipflop 25 to its B state. However, as long as the plus voltage is applied to the base of the transistor 101 from the terminal 143, each pulse applied from the transistor 77 to the base of the transistor 101 will be insufficient to switch the flipflop 25 to its B state. When a null occurs in the null sensing circuit 11 and thus causes the relay 75 to be energized and the contacts 135 to be opened, the plus voltage at the terminal 143 will no longer be applied to the base of the transistor 101. Accordingly, the next pulse applied from the transistor 77 to the base of the transistor 101 will cause the flipflop 25 to switch to its B state whereupon the oscillation of both the fast and slow oscillators 19 and 21 will be cut off through the diodes 121 and 123. In this manner both oscillators 77 and 79 are stopped and the stepping motor 13 stops stepping the reference capacitor at the time of the first pulse produced by the slow oscillator 21 after a null occurs. The position of the stepping motor 13 and the reference capacitor will thus indicate the classification zone of the part being gauged by the capacitor gauge 27.

At the start of the classifying operation, a pair of pushbutton operated switches 153 and 155, which are ganged together, are momentarily closed. The switch 153 momentarily connects the positive potential applied at terminal 143 to the base of the transistor 101 through a resistor 157 to set the flipflop 25 into its A state. The switch 155 closes a circuit through the contacts 151 connecting the relay 129 across the source of AC power. As a result the relay 129 energizes opening its normally closed contacts 127 and closing its normally open contacts 159. The contacts 159 close a circuit through the normally closed contacts 161 of the relay 133 across the pushbutton switch 155 to provide a holding circuit maintaining the relay 129 energized after the push-button switch 155 has been released. The opening of the contacts 127 opens the circuit to the relay 75 and de-energizes the relay 75 if it is energized. In this manner at the start of a classification cycle the flipflop 25 is put in its A state and the relay 75 is de-energized. Since the flipflop 25 will have been put in its A state, the oscillators 19 and 21 will oscillate and the motor 13 will step the dual capacitor 37.

In the classification operation it is necessary for the slow oscillator 21 to be synchronized with the position of the dual capacitor 41. That is, when the dual capacitor 41 reaches its starting position, the slow oscillator must be in the condition that it is in just after the transistor 77 fires. In other words the capacitor 85 must be discharged. To accomplish this synchronization, the stepping motor 13 in addition to driving the dual capacitor 37 also drives a cam 163 which operates a switch 165. The cam 163 is contoured and is positioned on the shaft of the stepping motor 13 so that it closes the switch 165 as the dual capacitor 37 approaches its starting position and then opens the switch 165 precisely when the dual capacitor reaches its starting position. When the switch 165 is closed, it connects the relay 133 between a source of positive potential applied at a terminal 167 and ground. Accordingly the relay 133 will be energized as the dual capacitor 35 approaches its starting position and then will be de-energized precisely when the dual capacitor 37 reaches its starting position. When the relay 133 is energized it opens its normally closed contacts 131 and 161. The opening of the normally closed contacts 161 opens the holding circuit to the relay 129 and thus de-energizes the relay 129. The circuit to the relay 75, however, is maintained open as the contacts 131 will be open when the relay 133 is energized. The closing of the contacts 169 connects ground to the emitter of the unijunction transistor 77 comprising the slow oscillator 21, thus discharging the capacitor 85 and preventing the slow oscillator 21 from oscillating. The fast oscillator 19, however will continue to oscillate and drive the stepping motor 13. Precisely when the dual capacitor 37 reaches its starting position, the cam 163 will open the contacts 165 and the relay 133 will be de-energized causing the contacts 169 to open. Thus the slow oscillator 21 will start oscillating with the capacitor 85 starting to charge up from a completely discharged condition precisely when the dual capacitor 37 reaches its starting position. In this manner the slow oscillator is synchronized with the position of the dual capacitor before the null sensing circuit 11 detects a null.

After the dual capacitor 37 reaches its starting position, both the slow and fast oscillators 21 and 19 will oscillate in synchronism and the motor 13 will step, driving the dual capacitor 37 until the null sensing circuit 11 detects a null. The stepping motor 13 will then continue to advance the dual capacitor until the next pulse is produced by the slow oscillator 21, at which time the stepping motor 13 will stop. The position of the dual capacitor or the stepping motor can then be used to indicate the classification zone of the part presently being gauged by the capacitance gauge 27.

It will be apparent that the circuit of the present invention instead of classifying precision mechanical parts can classify any subject matter which can be readily represented as capacitances. Moreover, within the scope of the invention the quantities to be classified could be represented in the null sensing circuit by other values instead of capacitances. For example, the quantities to be classified could be represented as voltages and compared with a reference voltage which is stepped in response to the output pulses from the fast oscillator. These and many other modifications may be made to the above-described specific embodiment of the invention without departing from the spirit and scope of the invention, which is defined in the appended claims.

What is claimed is:

1. A classification system comprising a first pulse generating means to generate pulses at a first rate, a second pulse generating means to generate pulses at a second rate greater than said first rate, said second pulse generating means being synchronized with said first generating means so that said second rate is a predetermined multiple of said first rate, reference means providing a reference value and incrementally changing said reference value in response to the pulses produced by said second pulse generating means, comparison means to compare said reference value with a value representing the quantity to be classified and to provide an indication when the compared values have a predetermined relationship, and means responsive to said indication by said comparison means to stop the incremental stepping of said reference means upon the next pulse produced by said first pulse generating means after said indication.

2. A classification system as recited in claim 1 wherein there is provided means to synchronize said reference means with said first pulse generating means so that said first pulse generating means is at a predetermined point in its cycle when the value provided by said reference means is at a predetermined starting value.

3. A classification system comprising first pulse generating means to generate pulses at a first rate, second pulse generating means to generate pulses at a second rate greater than said first rate, said second pulse generating means being synchronized with said first generating means so that said second rate is a predetermined multiple of said first rate, reference means for providing a reference capacitance and incrementally changing said capacitance in response to pulses produced by said second pulse generating means, gauging means to represent the quantity to be classified as a capacitance, comparison means to compare the capacitance provided by said reference means with the capacitance provided by said gauging means and to provide an indication when said capacitances have a predetermined relationship, and means responsive to said indication by said comparison means to stop the incremental stepping of said reference means upon the next pulse produced by said first pulse generating means after said indication.

4. A classification system comprising a first pulse generating means to generate pulses at a first rate, second pulse generating means to generate pulses at a second rate greater than said first rate, said second pulse generating means being synchronized with said first generating means so that said second rate is a predetermined multiple of said first rate, a flipflop having first and second stable states and operable when in said second stable state to prevent said second pulse generating means from generating pulses, reference means providing a reference value and incrementally changing said reference value in response to the pulses produced by said second pulse generating means, comparison means to compare said reference value with a value representing the quantity to be classified and to provide an indication when the compared values have a predetermined relationship, and means responsive to said indication by said comparison means to switch said flipflop from said first state to said second state upon the next pulse produced by said first pulse generating means after said indication.

5. A classification system comprising pulse generating means to generate pulses at a first rate and at a second rate which is greater than said first rate and which is a predetermined multiple of said first rate, reference means providing a reference value and incrementally changing said reference value in response to the pulses produced by said pulse generating means at said second rate, comparison means to compare said reference value with a value representing the quantity to be classified and to provide an indication when the compared values have a predetermined relationship, and means responsive to said indication by said comparison means to stop the incremental stepping of said reference means upon the next pulse produced at said first rate by said pulse generating means after said indication.

6. A classification system comprising first pulse generating means to generate pulses at a first rate, second pulse generating means to generate pulses at a second rate greater than said first rate, said second pulse generating means being synchronized with said first generating means so that said second rate is a predetermined multiple of said first rate, reference means providing a reference value and incrementally changing said reference value in response to the pulses produced by said second pulse generating means, comparison means to compare said reference value with the value representing the quantity to be classified and to provide an indication when the compared values have a predetermined relationship, and means responsive to said indication by said comparison means to stop the generation of pulses by said second pulse generating means upon the next pulse produced by said first pulse generating means after said indication.

7. A classification system comprising a first pulse generating means to generate pulses at a first rate, a second pulse generating means to generate pulses at a second rate greater than said first rate, said second pulse generating means being synchronized with said first generating means so that said second rate is a predetermined multiple of said first rate, a flipflop having first and second stable states and operable when in said second state to prevent said second pulse generating means from generating pulses, a stepping motor, means to apply pulses produced by said second generating means to said stepping motor to drive said stepping motor, reference means driven by said stepping motor providing a reference value and incrementally changing said reference value as said stepping motor steps, comparison means to compare said reference value with a value representing the quantity to be classified and to provide an indication when the compared values have a predetermined relationship, and means responsive to said indication by said comparison means to switch said flipflop from said first state to said second state upon the next pulse produced by said first pulse generating means after said indication.

8. A classification system as recited in claim 7 wherein there is provided means driven by said stepping motor to put said first pulse generating means at a predetermined point in its cycle in response to said stepping motor reaching a predetermined starting position.

9. A classification system as recited in claim 8, wherein said means driven by said stepping motor comprises a cam driven by said stepping motor, contacts operated by said cam, said cam being contoured and positioned relative to said stepping motor output so that said contacts change condition precisely when said stepping motor reaches said predetermined starting position, and means responsive to said change in condition of said contacts to put said first pulse generating means at said predetermined point in its cycle.

References Cited
UNITED STATES PATENTS

| | | | |
|---|---|---|---|
| 2,972,126 | 2/1961 | Hecox et al. | 340—172 |
| 2,476,496 | 7/1949 | Kliever | 318—29 |
| 3,146,386 | 8/1964 | Gerber | 310—49 XR |
| 3,228,025 | 1/1966 | Welch | 340—347 |
| 3,241,017 | 3/1966 | Madsen et al. | 310—49 |

RUDOLPH V. ROLINEC, *Primary Examiner.*

E. E. KUBASIWEICZ, *Assistant Examiner.*

U.S. Cl. X.R.

310—49; 318—29; 340—146.2, 347